United States Patent [19]
Borschert et al.

[11] Patent Number: 5,695,037
[45] Date of Patent: Dec. 9, 1997

[54] MOTOR VEHICLE CLUTCH ASSEMBLY HAVING A HYDRAULIC ACTUATOR FOR A FRICTION CLUTCH OF A MOTOR VEHICLE

[75] Inventors: Udo Borschert, Sennfeld; Lutz Leimbach, Oberwerrn; Ullrich Scherpf, Hammelburg; Peter Schmidt, Schweinfurt; Manfred Waning, Wonfurt; Michael Zottmann, Dittelbrunn, all of Germany

[73] Assignee: Fichtel & Sachs AG, Schweinfurt, Germany

[21] Appl. No.: 531,047

[22] Filed: Sep. 20, 1995

[30] Foreign Application Priority Data

Sep. 22, 1994 [DE] Germany .......................... 44 33 826.0

[51] Int. Cl.⁶ ............................................. F16D 23/14
[52] U.S. Cl. .................... 192/84.1; 192/84.7; 192/91 A
[58] Field of Search .............................. 192/84.1, 84.7, 192/85 CA, 90, 91 A

[56] References Cited

U.S. PATENT DOCUMENTS

| | | | |
|---|---|---|---|
| 4,607,736 | 8/1986 | Kelley | 192/91 A X |
| 4,829,221 | 5/1989 | Grunberg et al. | 192/90 X |
| 4,878,392 | 11/1989 | Jaeger et al. | 192/90 X |
| 4,890,711 | 1/1990 | Carmillet et al. | 192/90 X |
| 4,936,428 | 6/1990 | Leigh-Monstevens et al. | 192/90 X |
| 5,065,850 | 11/1991 | Bertin et al. | 192/90 |
| 5,135,090 | 8/1992 | Bertin et al. | 192/90 X |
| 5,245,258 | 9/1993 | Becker et al. | |
| 5,353,902 | 10/1994 | Flotow et al. | 192/90 X |

FOREIGN PATENT DOCUMENTS

| | | |
|---|---|---|
| 3706849 | 9/1988 | Germany . |
| 4238368 | 5/1994 | Germany . |

*Primary Examiner*—Andrea L. Pitts
*Attorney, Agent, or Firm*—Nils H. Ljungman and Associates

[57] ABSTRACT

An actuator is provided with a housing to hold a drive system, a transmission which converts its motion into an essentially translational movement of an output element, and an electronic subassembly. The housing has a first housing part which contains the transmission and a second housing part which supports the electronic subassembly, which is detachable from the transmission. The two housing parts, when connected to one another, and without any partitions separating them, form a compartment in which the transmission and the electronic subassembly are contained as enclosed components which are three-dimensionally engaged with one another, but are functionally separate from one another.

20 Claims, 6 Drawing Sheets

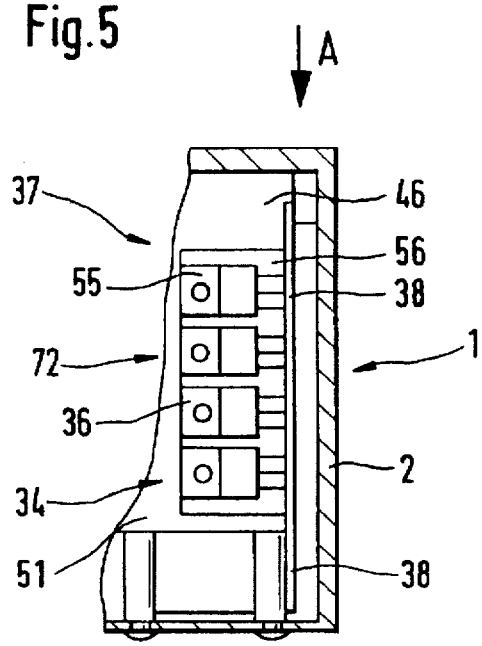
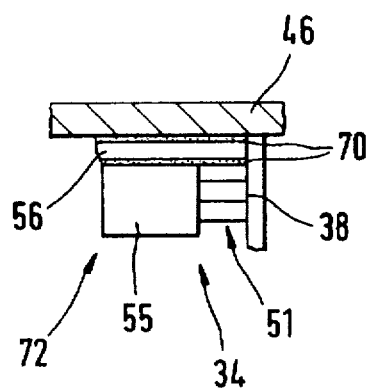
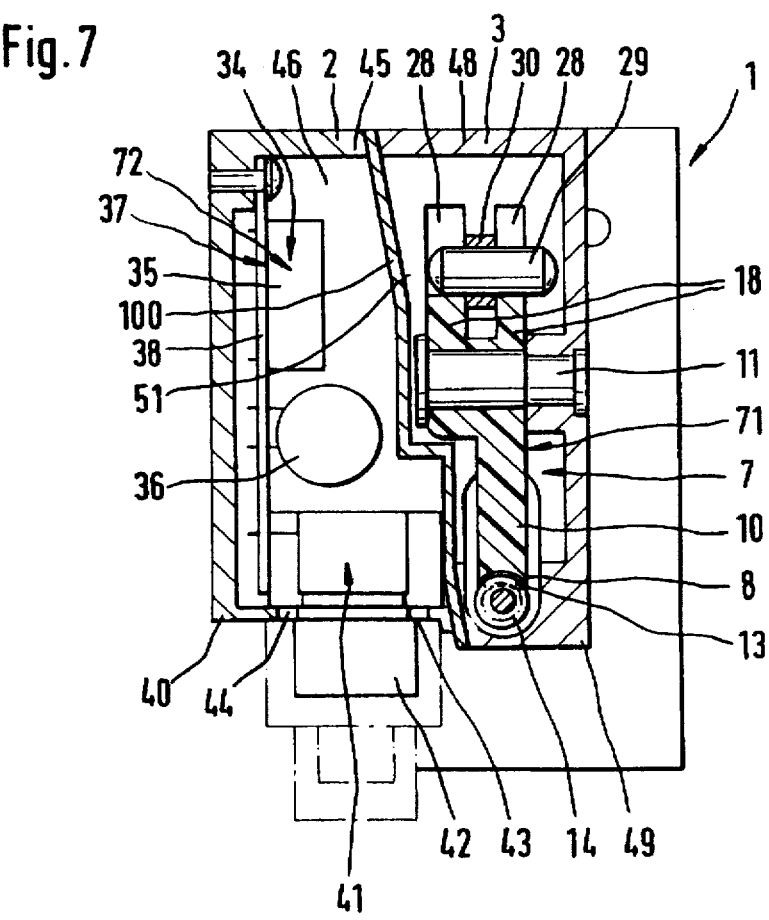

MOTOR VEHICLE CLUTCH ASSEMBLY HAVING A HYDRAULIC ACTUATOR FOR A FRICTION CLUTCH OF A MOTOR VEHICLE

BACKGROUND OF THE INVENTION

1. Field of the Invention

The present invention generally relates to an actuator, in particular for a motor vehicle friction clutch, which actuator includes a housing enclosing a drive, a transmission for converting the motion of the drive into an essentially translational movement of an output element, and an electronic subassembly acting on the drive.

2. Background Information

German Patent No. 42 38 368 A1 describes a motor vehicle friction clutch which is engaged and disengaged by means of an actuator. The actuator includes a drive in the form of an electric motor which, by means of a crank mechanism, activates the master cylinder of a hydraulic clutch disengagement system. The actuator has an electronic subassembly for the actuation of the drive.

The housing of the actuator has two compartments which are separated from one another by a partition. One of the compartments is designed to hold the above-mentioned crank mechanism, and the other is designed to hold the electronic subassembly. As shown in particular in FIG. 1 of the related patent, each of these compartments is significantly larger than the respective enclosed component (transmission or electronic subassembly), so that the housing is quite large in terms of its outside dimensions. Especially in motor vehicles in which there is little room available for the installation of such an actuator, the installation of the actuator can become a problem on account of the large housing.

If, in such actuators, both the transmission and the electronic subassembly are installed in the housing, the operation of the actuator can be verified by means of a test procedure. If during the test procedure, one of the enclosed components malfunctions, it is typically necessary to remove it from the housing and replace it with a new enclosed component.

OBJECT OF THE INVENTION

The object of the present invention is to design an actuator so that its housing can be designed as compact as possible, and which housing contains all the enclosed components only when each of them has passed a test to verify its correct operation.

SUMMARY OF THE INVENTION

The present invention teaches that this object can be accomplished by means of a housing, which housing can have a first housing part. The first housing part can contain the transmission. The housing can also have a second housing part, which second housing part can support an electronic subassembly, whereby the two housing parts, when combined with one another, can form a compartment, in which compartment the transmission and the electronic subassembly can be housed as enclosed components. The enclosed components can be three-dimensionally engaged with one another, but can be functionally separate from one another.

By essentially designing the housing in the form of two housing parts which can be detached from one another, one of which can hold the transmission and the other of which can hold the electronic subassembly, the result is two modules which can be separate from one another. Each of the two modules can be tested for its operation before the two parts of the housing are joined together. Preferably, once it has been established that both the mechanical module, which mechanical module includes the housing part with the transmission, as well as the electronic module, which electronic module includes the corresponding housing part and the electronic subassembly, operate correctly, the two parts of the housing, and thus the two modules, can then be connected to one another to form the actuator. The two housing parts can form a compartment in which both the electronic subassembly and the transmission can be contained. In this case, the two modular parts can preferably be oriented in relation to one another so that the two enclosed components, although they can be functionally separate from one another, can be three-dimensionally engaged with one another. This can be achieved, for example, if at a point in which the transmission has projections extending toward the electronic subassembly, the projections can encounter areas in which the electronic subassembly is provided with elements which have only very small dimensions in the direction of these projections. Likewise, at points where the transmission is very flat facing the electronic subassembly, elements of the electronic subassembly can be located which are comparatively large in the direction of the transmission. Interlaced, with one another in this manner, the space occupied by the transmission and the electronic subassembly can be kept as small as possible. As a result, the housing which encloses the enclosed components can also be designed very compactly.

In accordance with the above-mentioned arrangement of the transmission and the electrical subassembly relative to one another, it is possible to design the two subassemblies without a partition between them, so as not to interfere with the mutual engagement of the elements of the electronic and mechanical subassemblies. However, there can also be a partition between these elements, which partition can be shaped plastically so that the partition can be adapted to the size of the elements.

On the electronic subassembly in particular, it is possible to locate elements which extend farther toward the transmission on one side of the corresponding housing part, while flatter elements are located on the opposite side of the housing part. As discussed hereinbelow with reference to FIG. 3, the housing wall facing the taller elements is preferably taller than the housing wall to which the flatter elements are adjacent. As a result of this type of design of the walls, which walls can preferably be located opposite one another, there can be an additional advantage in that a printed circuit board, on which the electronic subassembly can be located, can be inserted from the side of the shorter housing wall into the corresponding housing part. Such a design can be advantageous, in particular, when, on the opposite, taller side, there is a passage opening to permit an object to extend from the electronic subassembly outward, e.g. a plug or jack. The electronic subassembly can then be inserted with an almost non-tipping, straight-line motion into the housing part and, as a result, the plug can run through the passage opening. After the subassembly is fastened in the housing part, the plug can project out of the housing part.

The passage opening is thereby preferably provided with some distance from the edge of the housing wall, since only in that manner is a perfect seal of the compartment with respect to the housing environment essentially guaranteed. The seal can enclose the object, which object is located in the passage opening and penetrates the housing wall.

In accordance with an embodiment of the present invention, the elements of the respective enclosed component can be arranged in the manner explained above, so that the elements can correspond in terms of size to a determined housing wall.

In accordance with an additional embodiment of the present invention, in a simple manner, an element which requires increased cooling, such as a power transistor, for example, can be fastened to a housing wall of the corresponding housing part, so that a thermal conducting bridge to the outside of the housing can be formed by the fastening element. The fastening element can include an electrically non-conducting thermal conductor. The heat which may be generated by the corresponding element of this subassembly can thereby be discharged from the equipment compartment of the housing over the shortest possible path.

In another embodiment, it is possible for the different electronic parts installed in the electronic subassembly, i.e. the control electronics and the power electronics, to be combined, so that the amount of wiring required between the individual parts of the electronic subassembly can be minimal.

As an additional feature, the design of the actuator can permit each of the elements to be tested and installed separately. Thus, the actuator can be easier to handle during manufacturing operations. Additionally, an optimal "interlacing" of the two modules with one another can be achieved either with or without a partition separating the two compartments.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a hydraulically operated clutch assembly for a motor vehicle, the clutch assembly comprising: a flywheel defining an axis of rotation and an axial direction parallel to the axis of rotation; a clutch disc; a pressure plate for applying an axially directed force to the clutch disc, with respect to the axis of rotation of the flywheel, to engage said clutch disc with the flywheel; the clutch disc being disposed between said flywheel and said pressure plate; the clutch disc comprising friction linings for contacting the pressure plate and the flywheel during engagement of the clutch disc with the flywheel; a device for hydraulically actuating the clutch disc; the hydraulic actuating device comprising: a chamber having a first end and a second end, at least a portion of the chamber comprising hydraulic fluid therein; an apparatus for being acted upon by the hydraulic fluid; the apparatus for being acted upon by the hydraulic fluid being disposed in the chamber; an apparatus for operatively connecting the pressure plate to the apparatus for being acted upon by the hydraulic fluid; a device for providing hydraulic fluid into and out of the space; a device for activating said hydraulic actuating device; the activating device comprising a housing; a mechanical drive mechanism for converting a first geometric movement into a second geometric movement; a device for driving the drive mechanism; the driving device being connected to the drive mechanism; the activating device further comprising an electronic apparatus; the electronic apparatus being operatively connected to the drive mechanism to provide signals to the drive mechanism; a cylinder for providing the hydraulic fluid under pressure to the device for providing hydraulic fluid into and out of the chamber; the drive mechanism being connected to the cylinder to drive the hydraulic fluid into and out of the chamber; the housing of the activating device comprising a first unitary part and a second unitary part; the first unitary part and the second unitary part of the housing being disposed substantially adjacent one another; the first unitary part comprising an element for being connected to the second unitary part; the second unitary part comprising an element for being connected to the first unitary part; the first unitary part and the second unitary part being connected together to form an internal cavity within the housing; at least a substantial portion of the drive mechanism being disposed within the first unitary part; at least a substantial portion of the electronic apparatus being disposed within the second unitary part; and the electronic apparatus and the drive mechanism being disposed substantially adjacent one another in the internal cavity formed by the first unitary part and the second unitary part.

Another aspect of the present invention resides broadly in a hydraulically operated clutch assembly, for a motor vehicle, which clutch assembly comprises a flywheel defining an axis of rotation and an axial direction parallel to the axis of rotation, which clutch assembly further comprises a clutch disc and a pressure plate for applying an axially directed force to the clutch disc with respect to the axis of rotation of the flywheel to engage the clutch disc with the flywheel, which clutch disc is disposed between the flywheel and the pressure plate, which clutch disc comprises friction lining device for contacting the pressure plate and the flywheel during engagement of the clutch disc with the flywheel, which clutch assembly further comprises device for hydraulically actuating the clutch disc, which hydraulic actuating device comprises chamber device having a first end and a second end, with at least a portion of the chamber device containing hydraulic fluid therein, which clutch assembly further comprises device for being acted upon by hydraulic fluid, which device for being acted upon by hydraulic fluid is disposed in the chamber device, which clutch assembly further comprises device for operatively connecting the pressure plate to the device for being acted upon by hydraulic fluid, which clutch assembly further comprises device for providing hydraulic fluid into and out of the chamber device to actuate the pressure plate, device for activating the hydraulic actuating device; the activating device comprising: a housing; a mechanical drive mechanism for converting a first geometric movement into a second geometric movement; device for driving the drive mechanism; the driving device being connected to the drive mechanism; the activating device further comprising electronic device; the electronic device being operatively connected to the drive mechanism to provide signals to the drive mechanism; cylinder device for providing hydraulic fluid under pressure to the device for providing hydraulic fluid into and out of the chamber device; the mechanical drive mechanism being connected to the cylinder device to drive hydraulic fluid into and out of the chamber device; the housing of the activating device comprising a first unitary part and a second unitary part; at least portions of the first unitary part and at least portions of the second unitary part of the housing being disposed substantially adjacent one another; the first unitary part comprising device for being connected to the second unitary part; the second unitary part comprising device for being connected to the first unitary part; the first unitary part and the second unitary part being connected together, by the device for being connected to the second unitary part and the device for being connected to the first unitary part, to form a three-dimensional, internal cavity within the housing; at least a substantial portion of the mechanical drive mechanism being disposed within the first unitary part; at least a substantial portion of the electronic device being disposed within the second unitary part; and the electronic device and the mechanical drive mechanism being disposed substantially adjacent one another in the three-dimensional, internal cavity formed by the first unitary part and the second unitary part.

Yet another aspect of the present invention resides broadly in a method of manufacturing an actuator for operating a hydraulically operated clutch assembly for a motor vehicle, which clutch assembly comprises a flywheel defining an axis of rotation and an axial direction parallel to the axis of rotation, which clutch assembly further comprises a clutch disc and a pressure plate for applying an axially directed force to the clutch disc with respect to the axis of rotation of the flywheel to engage the clutch disc with the flywheel, which clutch disc is disposed between the flywheel and the pressure plate, which clutch disc comprises friction lining device for contacting the pressure plate and the flywheel during engagement of the clutch disc with the flywheel, which clutch assembly further comprises device for hydraulically activating the clutch disc, which hydraulic activating device comprises chamber device having a first end and a second end, with at least a portion of the chamber device containing hydraulic fluid therein, which clutch assembly further comprises device for being acted upon by hydraulic fluid, which device for being acted upon by hydraulic fluid is disposed in the chamber device, which clutch assembly further comprises device for operatively connecting the pressure plate to the device for being acted upon by hydraulic fluid, which clutch assembly further comprises device for providing hydraulic fluid into and out of the chamber device to activate the pressure plate, the method comprising the steps of: providing a housing, the housing comprising a first unitary part and a second unitary part; providing a mechanical drive mechanism for converting a first geometric movement into a second geometric movement; providing device for driving the drive mechanism; providing electronic device to provide signals to the drive mechanism; providing cylinder device, the cylinder device for providing hydraulic fluid under pressure to the device for providing hydraulic fluid into and out of the chamber device; providing device on the second unitary part for being connected to the first unitary part; providing device on the first unitary part for being connected to the second unitary part; the method further comprising the steps of: connecting the driving device to the drive mechanism; operatively connecting the electronic device to the drive mechanism to provide signals to the drive mechanism; connecting the mechanical drive mechanism to the cylinder device to drive hydraulic fluid into and out of the chamber device; disposing at least portions of the first unitary part and at least portions of the second unitary part of the housing substantially adjacent one another; disposing at least a substantial portion of the mechanical drive mechanism within the first unitary part; disposing at least a substantial portion of the electronic device within the second unitary part; connecting the first unitary part and the second unitary part together, by the device for being connected to the second unitary part and the device for being connected to the first unitary part; forming a three-dimensional, internal cavity within the housing by connecting the first unitary part to the second unitary part; and thus disposing the electronic device and the mechanical drive mechanism substantially adjacent one another within the three-dimensional, internal cavity formed by connecting the first unitary part and the second unitary part.

BRIEF DESCRIPTION OF THE DRAWINGS

The present invention is explained in greater detail below with reference to the accompanying drawings, in which:

FIG. 5 shows the same view as in FIG. 3, but along Line V—V in FIG. 1;

FIG. 6 shows the same view as in FIG. 5, but viewed in the direction indicated by Arrow A;

FIG. 7 shows the same view as in FIG. 3, but with a partition: and

DESCRIPTION OF THE PREFERRED EMBODIMENT

Figure 3:
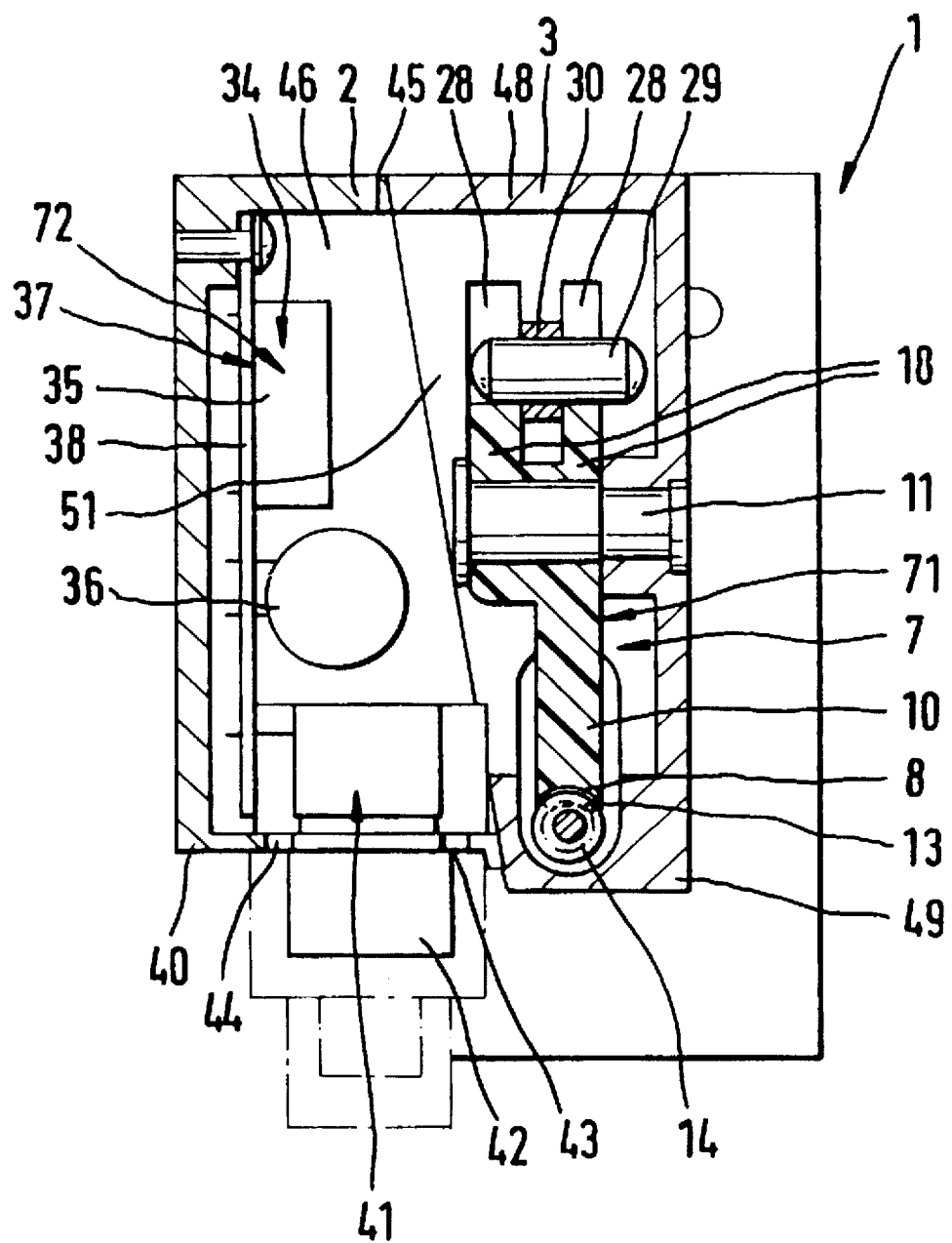
FIG. 3 shows a cross section of the actuator seen along Line III—III in FIG. 1.
Figure 4:
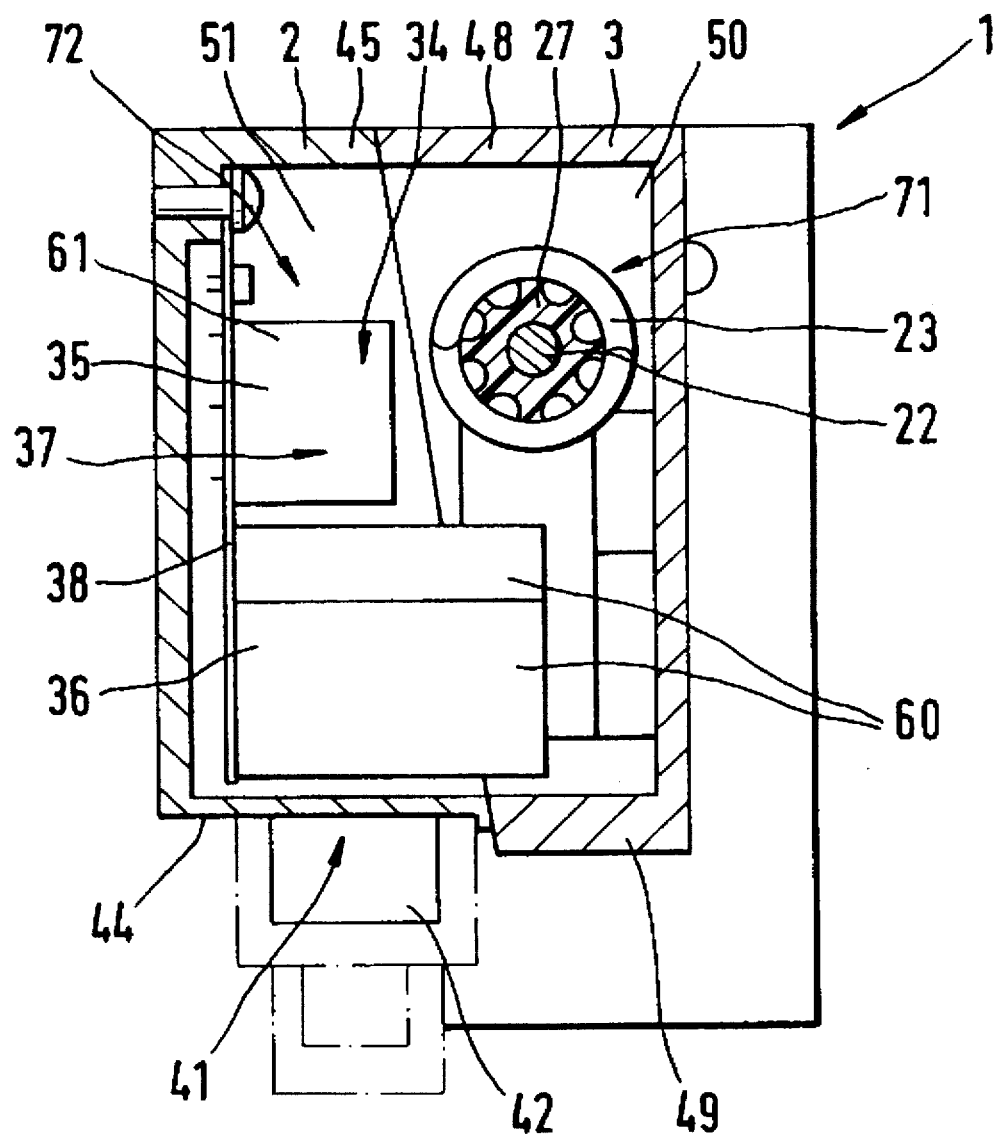
FIG. 4 shows the same view as in FIG. 3, but along Line IV—IV in FIG. 1.

FIGS. 1 to 4 show an actuator for a motor vehicle friction clutch, which friction clutch, in the illustrated embodiment, can have a hydraulic clutch disengagement system. The actuator device can include a housing 1, which housing 1 can have housing parts 2 and 3 (as shown in FIGS. 3 and 4). The housing 1 can also have a drive 4 in the form of an electric motor 5, which electric motor 5, by means of a transmission 7, can actuate a hydraulic master cylinder 9 of the hydraulic clutch disengagement system. The transmission 7 can be in the form of a crank mechanism, and the transmission 7 can function as an enclosed component 71 in the housing part 2.

The transmission 7 can work as a worm gear pair 8, which worm gear pair 8 can have a segment worm gear 10. The segment worm gear 10 can be rotationally mounted on a bearing neck 11, which bearing neck 11 can be fastened by its one end in the housing part 3 (as shown in FIG. 3). A worm gear 15 can sit directly on a drive shaft 14 of the drive 4, which worm gear 15 can be engaged with a worm gear thread 13 on the circumference of the segment worm gear 10. The driven shaft 14 can be mounted, with its free end, in the housing part 3 by means of a sleeve 17. On the segment worm gear 10 there can be cheeks 18, which cheeks 18, viewed in the axial direction of the bearing neck 11, can be located at some distance from one another.

Figure 1:
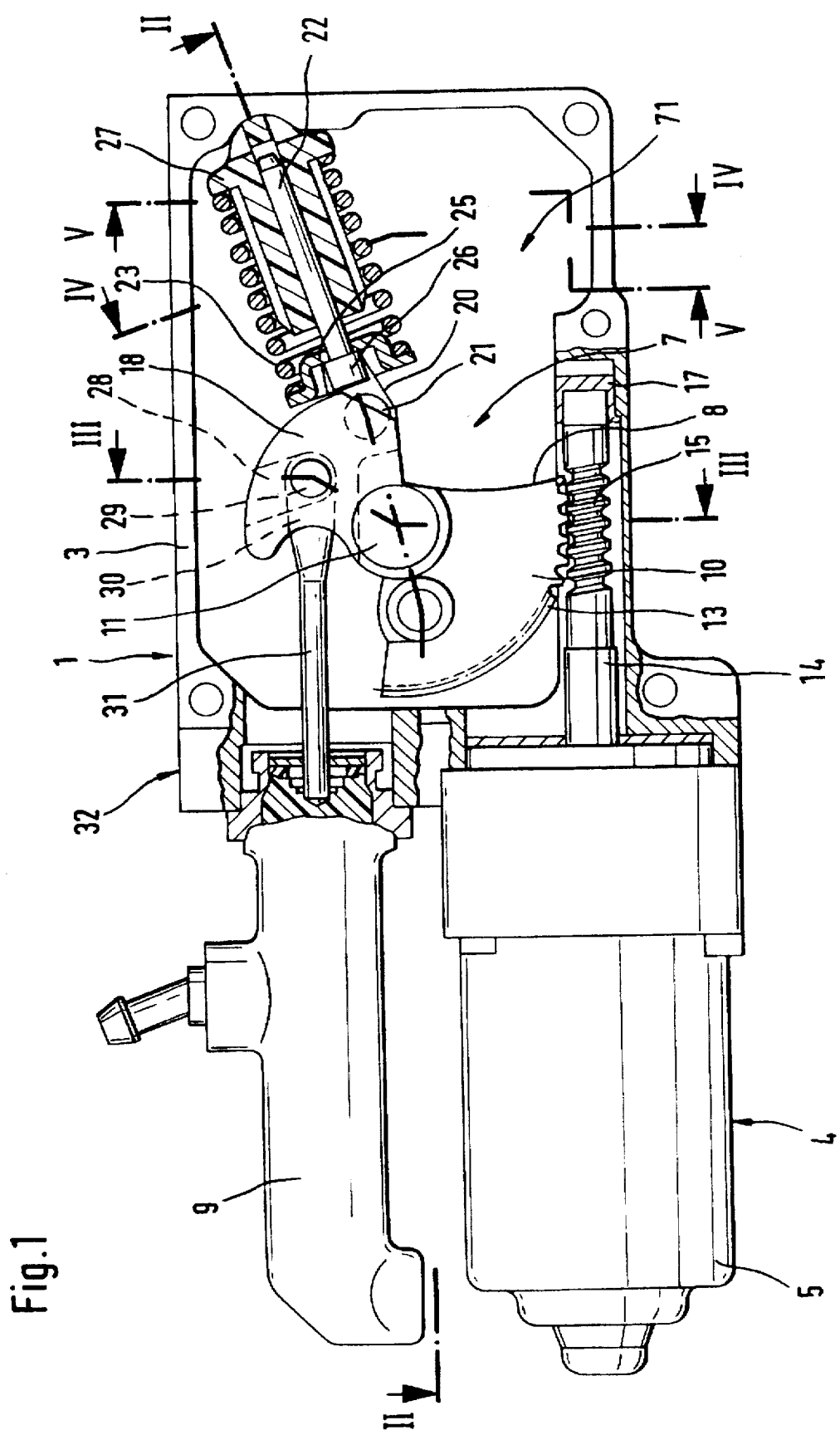
FIG. 1 shows an overhead view in partial cross section of an electric motor actuator for a motor vehicle friction clutch.
Figure 2:
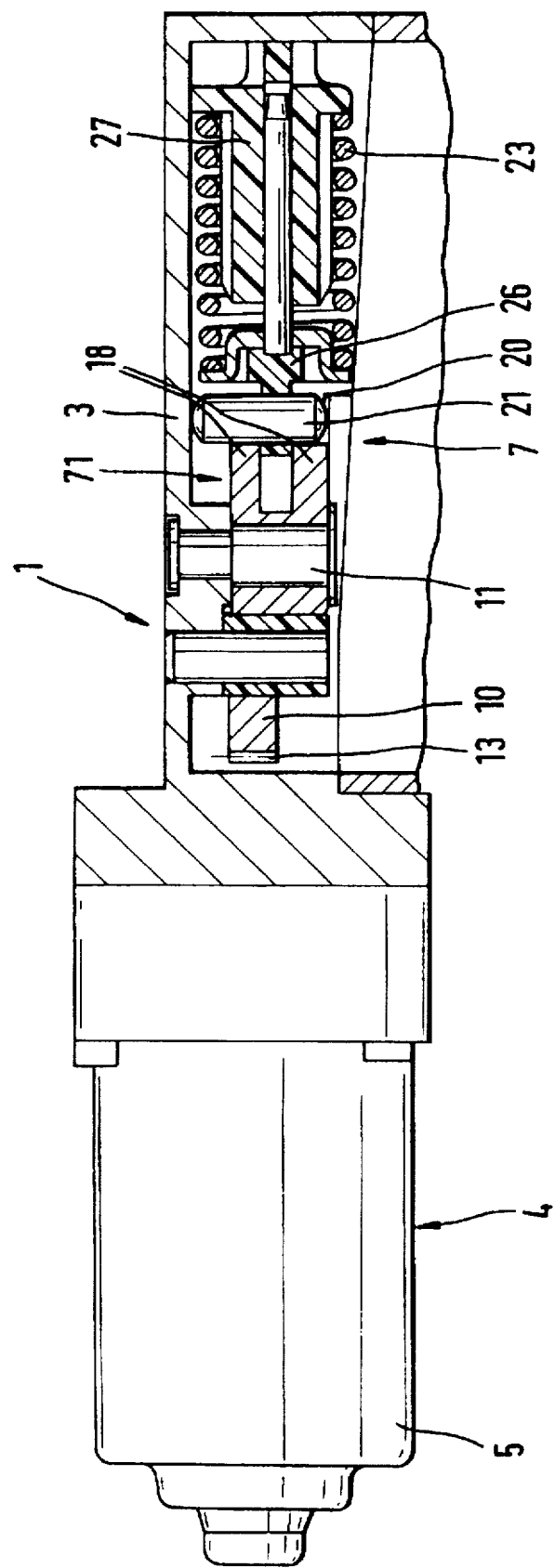
FIG. 2 shows a view of the actuator along Line II—II in FIG. 1.

In the cheeks 18, there can be first recesses 20, which first recesses 20 can preferably be aligned with one another. There can be a bolt 21 located within the first recesses 20, which bolt 21 can run essentially parallel to the bearing neck 11 and can be pressed essentially toward the axis of rotation of the driven shaft 14 by a tappet 22. Pressure can be applied to the tappet 22 by a compensation spring 23. The tappet 22, on its end facing the bolt 21, can have a spring plate 25. The spring plate 25 can be supported, on one hand, on a shoulder 26 of the tappet 22, which shoulder 26 can be designed with a radial enlargement. On the other hand, the spring plate 25 can locate the corresponding end of the compensation spring 23. The opposite end of the compensation spring 23 can be supported on a plastic bushing 27, which plastic bushing 27 can surround the tappet 22. In the limit position of the plastic bushing 27, when the plastic bushing 27 is essentially eccentric to the center axis of the bearing neck 11, as illustrated in FIG. 1, the plastic bushing 27 is preferably mounted so that it can pivot in the housing part 3.

At an angular offset, with respect to the center axis of the bearing neck 11, there can be additional recesses 28 (FIG. 3) in the cheeks 18 of the segment worm gear 10. The additional recesses 28 can be aligned with one another and can hold a bolt 29. The bolt 29 can be surrounded by an eye 30 of a piston rod 31 of the hydraulic master cylinder 9. The recesses 28 can extend toward the compensation spring 23, so that the bolt 29, once the bolt 29 has been introduced from radially outside into the recesses 28, can be held by the action of the compensation spring 23 on the radially inner end of the recesses 28. The angle of rotation of the segment worm gear 10 can thereby be limited so that this advantageous action of the compensation spring 23 can be preserved under essentially all conditions.

The transmission 7 can preferably function as follows:

A motion supplied by the drive 4 can cause a rotation of the drive or output shaft 14, so that the worm gear 15 located on the drive shaft 14, and thus the segment worm gear 10, can be placed in a rotational motion. And as a function of the direction of the drive 4, the piston rod 31 of the hydraulic master cylinder 9 can be moved inward or outward.

The compensation spring 23 can thereby act as follows:

In the limit position of the segment worm gear 10 corresponding to the engaged position of the clutch, tension can be applied to the compensation spring 23. If the drive 4 propels the segment worm gear 10 in the clutch disengagement direction, i.e. counterclockwise with respect to FIG. 1, the compensation spring 23 is essentially relaxed after passing through its top dead center position. Thus, the compensation spring 23 can assist the drive 4. In this manner, the clutch can be disengaged quickly, even when the drive mechanism is comparatively weak. In the engagement direction, the electric motor 5, the direction of rotation of which has been reversed, i.e. clockwise with respect to FIG. 1, can be assisted by the clutch application spring (not shown here but see FIGS. 8 and 11), so that in spite of the comparatively low drive power, tension can once again be applied to the compensation spring 23.

In summary, in accordance with an embodiment of the present invention, the power from the drive 4 can permit rotation of the output shaft 14 in one direction, or, alternatively, in another direction. The threads of the worm gear 15 of the output shaft 14 can thereby come into contact with the worm gear threads 13 of the segment worm gear 10. As a result, the segment worm gear 10 can rotate in a direction corresponding to the direction of rotation of the output shaft 14. The piston rod 31 can preferably be fastened to the segment worm gear 10 thereby permitting the piston rod 31 to move in a longitudinal direction with respect to the transmission 7. The piston rod 31 can thereby move inward or outward with respect to the hydraulic master cylinder 9. When the clutch is in the engaged position, the segment worm gear 10 is essentially in its limit position, as shown in FIG. 1. In the limit position of the segment worm gear 10, compensation spring 23 can preferably be taut with the tension applied thereto. When the drive 4 rotates the segment worm gear 10 in the opposite direction, i.e. counterclockwise with respect to FIG. 1, the clutch can become disengaged. As the clutch begins to disengage, the compensation spring 23 can become relaxed, thus essentially assisting in the quick disengagement of the clutch.

A mechanical module 32 can be formed by the transmission 7 described above, together with the housing part 3, in which housing part 3 and the transmission 7 can be located. To control the drive mechanism 4, on the other hand, there can be an electronic subassembly 34 (FIGS. 3 and 4). The electronic subassembly 34 can be active in the housing part 2 as an enclosed component 72. The electronic subassembly 34 can have control electronics 35 and power electronics 36. Along with the housing part 2, the electronics subassembly 34 can form an electronics module 37. Both the elements of the control electronics 35 and the elements of the power electronics 36 can be mounted on a common circuit board 38.

The circuit board 38 can be designed, on one end, with an object 41, e.g. a plug 42, which object 41 can extend through a housing wall 40 of the housing part 2. For the passage of the plug 42, the housing wall 40 can be provided with a passage opening 43. The passage opening can have a seal 44, which seal 44 can hold the plug 42, and in which seal 44, the plug 42 can be fitted. The passage opening 43 is preferably located at some distance from the edges of the housing wall 40, thereby essentially permitting the passage opening 43 to achieve a more reliable seal for the plug 42. To essentially guarantee an unhindered insertion of the circuit board 38 with the elements of the control electronics 35 and the power electronics 36, in spite of this location of the passage opening 43, a housing wall 45 of the housing part 2, located opposite the housing wall 40, can be significantly shorter than the housing wall 40. In this manner, the printed circuit board 38 can be inserted with a nearly straight-line motion into the housing part 2, and thus the plug 42 can be inserted into the passage opening 43.

Lateral housing walls 46, which lateral housing walls 46 connect the two housing walls 40 and 45 to one another, on the side of the housing walls 40 and 45 facing the free ends of the elements of control electronics 35 and the power electronics 36, can run on a slope, to compensate for the difference in height between the housing wall 40 and the housing wall 45. The elements of the control electronics 35 and of the power electronics 36 can thereby be located on the circuit board 38 so that they essentially follow the slope of the side walls 46, i.e. the tallest elements 60 (FIG. 4) are preferably next to the housing wall 40, and the shortest elements 61 are preferably next to the housing wall 45.

In summary, in accordance with an embodiment of the present invention, the housing wall 40 can preferably include a passage opening 43, which passage opening 43 can receive the plug 42. The passage opening 43 is preferably located away from the ends of the housing wall 40 to permit the housing wall 40 to surround the plug 42 and thereby form an essentially tight seal around the plug 42. To facilitate the insertion of the circuit board 38, despite this location of the passage opening 43 in the housing wall 40, the opposite housing wall 45 can preferably be designed to be shorter than the housing wall 40. Due to this shorter design of the housing wall 45, additional space can essentially be provided whereby the circuit board 38 can be more easily inserted into the housing part 2. Furthermore, the housing walls 40 and 45 can be connected to one another by lateral housing walls 46. Thus, one end of the lateral housing walls 46 can be located adjacent the shorter housing wall 45. Likewise, the opposite end of the lateral housing walls 46 can be located adjacent the higher housing wall 40. Therefore the end of the lateral housing walls 46 adjacent the shorter housing wall 45 can preferably be shorter than the other end of the lateral housing walls 46 adjacent the higher housing wall 40. Thus, to essentially compensate for the differences in height between the housing walls 40 and 45, the lateral housing walls 46 can preferably extend at an angle between the housing walls 40 and 45.

This design of the housing part 2 can be adapted to the housing part 3, in that the housing part 3 can also have a taller housing wall 48 and a shorter housing wall 49. The taller housing wall 48 and the shorter housing wall 49 can be connected to one another by lateral housing walls 50, which lateral housing walls 50 can run diagonally. In the housing part 3 (see FIG. 4), the transmission 7 can be oriented so that the greatest possible account is taken of the slope of the side walls 50. For example, as shown in FIG. 3, the output shaft 14, of the drive 4, and the flat tooth segment side of the segment worm gear 10 engaged with the output shaft 14, can be located next to the shorter housing wall 49. While on the opposite side of the bearing neck 11, the segment worm gear 10 can be taller, due to the cheeks 18. The cheeks 18 can be next to the taller housing wall 48.

When designed in this manner, the two housing parts 2, 3 can be assembled with one another so that the taller housing wall 40 of the housing part 2 can come into contact with the shorter housing wall 49 of the housing part 3, and consequently, the shorter housing wall 45 of the housing part 2 can come into contact with the taller housing wall 48 of the housing part 3. The slope of the lateral housing walls 46 of the housing part 2 can thereby be essentially the same as the slope of the side walls 50 of the housing part 3, so that after the two housing parts 2,3 have been connected and fastened to one another, the housing 1 can have an essentially rectangular external shape. When assembled in this manner, the housing 1 can enclose a compartment 51, in which compartment 51 both the transmission 7 and the electronic subassembly 34 can be located.

As a result of the orientation of the transmission 7 and of the electronic subassembly 34 in relation to the slope of the side walls 46 and 50, there can be a layout in which the taller elements 60 of the electronic control system 35 or of the power electronics 36 project outward in an area in which the transmission 7 is very flat on its side facing the output shaft 14 of the drive 4. Whereas, on the opposite side of the transmission 7, on the other side of the bearing neck 11, on which bearing neck 11 the transmission 7 is tallest, essentially shorter elements 61 of the control electronics 35 or of the power electronics 36 are located. As a result of this "interlacing" of the transmission 7 with the electronic subassembly 34, the housing 1 can be kept essentially as flat as possible. The entire actuator can thereby be very compact, and can accordingly be installed essentially very easily in vehicles with little space available for an actuator. It is also essentially possible, as illustrated in FIGS. 3 and 4, to omit the partition between the modules 32 and 37 altogether. Alternatively, it is also essentially possible to provide a partition 100, as shown in FIG. 7, which partition 100 can be shaped plastically so that the partition 100 can be adapted to the size of the elements in the two modules 32 and 37.

Returning to the effect of the housing part 3 with the transmission 7 as a mechanical module 32, and the housing part 2 together with the electronic subassembly 34 as an electronic module 37, it is advantageously possible to install the two modules 32 and 37 independently of one another. It is also essentially possible to test the two modules 32 and 37 separately before assembly to verify their correct operation, so that the actuator can be completely installed only when the correct operation of both modules 32 and 37 has essentially been verified.

In accordance with an embodiment of the present invention, the components of the actuator, e.g. the housing 2 and the housing 3, can be connected with the actuator by fastening elements such as screws or rivets or bolts or adhesives e.g. epoxy or glue.

As shown in FIGS. 5 and 6, the power electronics 36 of the electronic subassembly 34 can contain elements 55 such as power transistors, for example. When the elements 55 are in operation, these elements 55 can generate a great deal of heat. To essentially guarantee the correct operation of both the electronic subassembly 34 and the transmission 7, this heat should not remain in the compartment 51 and should be discharged outward as rapidly as possible. For this reason, the power transistors can preferably be fastened by means of an electrical insulating thermal conductor 56, e.g. a film, directly to one of the housing walls, e.g. to a side wall 46 of the housing part 2. The fastening can be accomplished advantageously if the thermal conductor 56 is designed with self-adhesive surfaces 70 on both sides (FIG. 6). Thereby the thermal conductor 56 can be fastened to the corresponding side wall 46 by the first adhesive surface, and the power transistors can be fastened to the thermal conductor 56 by the second adhesive surface.

Figure 8:
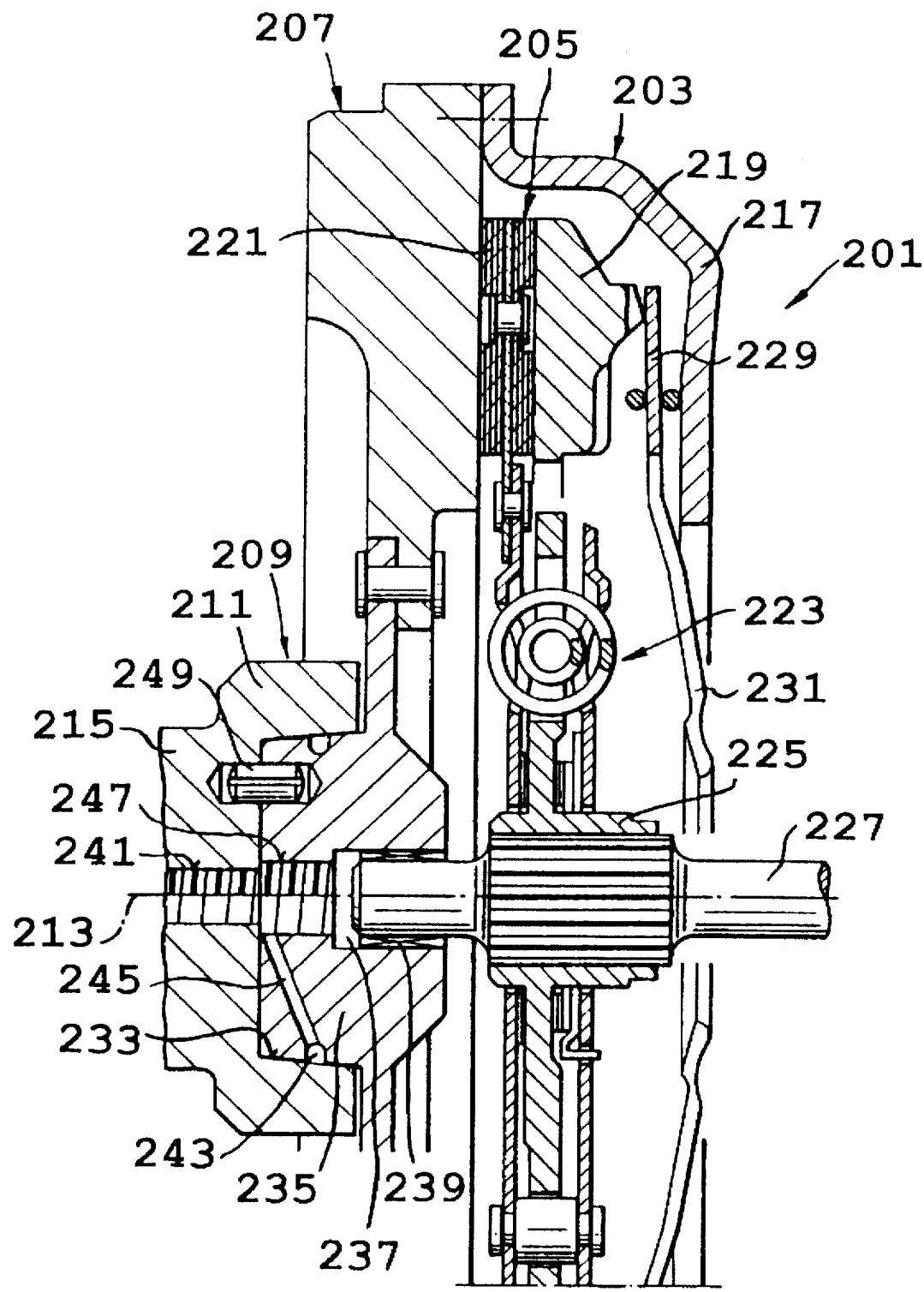
FIG. 8 shows a partial axial longitudinal section through a clutch assembly fastened to a crankshaft of an engine of a motor vehicle.

FIG. 8 shows a motor vehicle friction clutch 201 with which the present invention could be utilized. It should be understood that the components found hereinbelow can be considered as being interchangeable with any similar components discussed hereinabove. The friction clutch 201 shown in FIG. 8 can generally include a pressure plate unit, designated 203 in general, a clutch disc 205 and a flywheel 207. The friction clutch 201 can preferably be mounted by means of a fastening system 209, preferably on the output end 211 of a crankshaft 215, which crankshaft 215 can rotate around an axis of rotation 213 on an internal combustion engine (not shown) of the motor vehicle.

The pressure plate unit 203, in a manner which is well known in the art, can have a clutch housing 217, which clutch housing 217 can be fixed to the flywheel 207, for example by welding, so that the clutch housing 217 can be detached, but preferably does not detach during operation. An essentially disc-shaped application plate or pressure plate 219 can be mounted on the clutch housing 217. The application plate 219 can be mounted by means of tangential leaf springs, for example, which tangential leaf springs are not illustrated in any additional detail, but which tangential leaf springs may be disclosed in U.S. Pat. No. 4,757,597 to Kohler on Jul. 19, 1988, entitled "Method of Assembling a Friction Clutch", and U.S. Pat. No. 4,640,398 to Kolb et al. on Feb. 3, 1987, entitled "Friction Clutch with Tangential Leaf Springs". The application plate 219 can be mounted by means of tangential leaf springs so that the application plate 219 essentially does not rotate, but can preferably move axially.

Preferably between the application plate 219 and the flywheel 207, there can be friction linings 221 of the clutch disc 205, which friction linings 221 can be connected to a hub 225 of the clutch disc 205 in a manner well known in the art, such as by means of a torsional vibration damper 223, preferably in a rotationally elastic manner. The clutch disc 205 can be guided preferably by means of the hub 225 in an essentially non-rotating, but axially movable manner on an input shaft 227 of a transmission. The input shaft 227 can preferably be disposed downstream of the friction clutch 201 in the torque transmission path. A membrane spring 229, preferably held in the clutch housing 217, can apply pressure to the application plate 219, and the friction lining 221 can hold the application plate 219 in a friction-tight manner preferably against the flywheel 207. A disconnecting or throwout lever (not shown here) can act on the flexible tongues 231 preferably of the membrane spring 229, whereby the load on the application plate 219 can be relieved and the clutch 201 can be disconnected or disengaged. In accordance with one embodiment, if the present invention is utilized as a slave cylinder, the slave cylinder (not shown here) can preferably be operatively attached, by means of a piston rod (not shown here), to the throwout lever, the throwout lever then causing the membrane spring 229 to release the load on the application plate 219. Additional types of disconnecting or disengaging levers may be disclosed in U.S. Pat. No. 4,751,990 to Schraut et al. on Jun. 21, 1988, entitled "Multi-disc Clutch Unit, Particularly for Heavy Duty Motor Vehicles", and U.S. Pat. No. 4,238,018 to Maucher on Dec. 9, 1980, entitled "Disengaging Unit for Drawing Disengagable Friction Clutches".

The output end 211 of the crankshaft can preferably contain a central opening 233 in the face of the crankshaft 215, the inner jacket or surface of which opening 233 can form a taper surface which can taper axially into the crankshaft 215. A conical extension 235 which can project axially from the flywheel 207, can extend into the opening 233 in the end of the crankshaft 215, and the outer jacket of the conical extension 235 can have a taper surface which can essentially match the inner jacket of the opening 233 in the face of the crankshaft 215. The matching taper surfaces of the opening 233 and of the conical extension 235 can form the essentially axial joint surfaces of a radial interference fit, which can radially guide the flywheel 207 on the crankshaft 215, and can transmit the torque from the crankshaft 215 to the clutch 201.

The conical extension 235 can form a hub of the flywheel 207 and can contain a progressively stepped hole 237, which stepped hole 237 can expand radially toward the clutch disc 205. The stepped hole 237, preferably in its expanded portion, can house a pilot bearing 239, preferably for the radial guidance of the crankshaft-side end 215 of the transmission input shaft 227. The face or central opening 233 can continue or extend along the same axis as the stepped hole 237, preferably into a threaded hole 241, into which threaded hole 241 a clamping bolt (not shown) can be screwed through the hub 225, preferably for the assembly of the friction clutch 201, before the insertion of the transmission input shaft 227 into the hub 225. By means of the clamping bolt, which is not illustrated in any further detail and should be removed following assembly, the conical extension 235 can be axially pressed into the opening 233 in the end of the crankshaft 215.

The flywheel 207 can preferably be removed from the crankshaft 215 by means of hydraulically actuated extraction devices, which can preferably act by means of rod-sleeve connections through the hub 225 of the clutch disc 205 to the connection area 209. The conical extension 235 can be provided with threaded connections, for example, in the vicinity of its graduated or stepped hole 237. The extraction of the flywheel 207 from the output end 211 can also possibly be done by hydraulic expansion of the output end 211. For this purpose, there can preferably be a ring-shaped groove 243 on the circumference of the conical extension 235, which ring-shaped groove 243 can be connected by means of one or more radial channels 245, to a central pressure medium connection, e.g. designed as a threaded hole 247. The threaded hole 247 may form a part of the stepped hole 237. The threaded hole 247 can preferably be connected through the hub 225 of the clutch disc 205 to a hydraulic pressure unit (not shown), which hydraulic pressure unit can hydraulically expand the opening 233 in the end of the crankshaft 215, preferably by means of the closed circular line or groove 243.

The flywheel 207 can be connected relative to the crankshaft 215 by means of an indexing pin 249, which indexing pin 249 can define the angular position of the flywheel 207 relative to the crankshaft 215.

It should be understood that the friction clutch 201 shown in FIG. 8 is presented only by way of example of one type of clutch in which the present invention may be incorporated.

One feature of the invention resides broadly in the actuator, in particular for a motor vehicle friction clutch, with a housing which encloses a drive, a transmission which converts the motion of the drive into an essentially translational movement of an output element, and an electronic subassembly which acts on the drive, characterized by the fact that the housing 1 has a first housing part 3 which contains the transmission 7 and a second housing part 2 which supports the electronic subassembly 34, whereby the two housing parts 2, 3 when combined with one another form a compartment 51 in which the transmission 7 and the electronic subassembly 34 are housed as enclosed components 71, 72 which are three-dimensionally engaged with one another, but are functionally separate from one another.

Another feature of the invention resides broadly in the actuator characterized by the fact that elements 18, 60 of the respective enclosed component 71, 72 which extend farther toward the respective other enclosed component 71, 72 penetrate into areas of the latter in which there are elements 13, 14 which do not extend as far toward the latter enclosed component 71, 72.

Yet another feature of the invention resides broadly in the actuator characterized by the fact that the housing parts 2, 3, at their connection point, each have a taller housing wall 40, 48 and, opposite it, a shorter housing wall 45, 49.

Still another feature of the invention resides broadly in the actuator characterized by the fact that the taller housing wall 40, 48 has a passage opening 43, in which a seal 44 which surrounds an object 41 which penetrates the housing wall 40 can be located.

A further feature of the invention resides broadly in the actuator characterized by the fact that the elements 13, 14, 15, 18, 60 and 61 of the respective enclosed component 70, 71 are located with respect to the corresponding housing part 2, 3 so that the taller elements 18, 60 are next to the taller housing wall 40, 48, and the shorter elements 13, 14, 15, 61 sit next to the shorter housing wall 45, 49.

Another feature of the invention resides broadly in the actuator characterized by the fact that on at least one housing wall 40, 45, 46, 48, 49, 50 of the housing part 2 which holds the electronic subassembly 34, at least one element 55 of this subassembly 34, preferably a power transistor, is fastened by means of which an electrically insulating thermal conductor 56 which generates a bilateral dynamic effect.

Yet another feature of the invention resides broadly in the actuator characterized by the fact that the electronic subassembly 34 comprises both control electronics 35 and power electronics 36.

Still another feature of the invention resides broadly in the actuator characterized by the fact that the housing part 3, in connection with the transmission 7, forms a mechanical module 32, and the housing part 2 in connection with the electronic subassembly 34, forms an electronic module 37, each of which can be installed and tested separately.

A further feature of the invention resides broadly in the actuator characterized by the fact that the two modules 32, 37 are separated from one another by a partition 100 which can be shaped plastically so that it can be adapted to the size of the elements 13, 14, 15, 18, 60 and 61 of the respective enclosed components 70, 71.

Another feature of the invention resides broadly in the actuator characterized by the fact that the two modules 32, 37 form a common compartment 51, without any partitions separating them.

The components disclosed in the various publications, disclosed or incorporated by reference herein, may be used in the embodiments of the present invention, as well as, equivalents thereof.

Some examples of electronic components which may be utilized in accordance with the present invention may be found in the following U.S. patents: U.S. Pat. No. 5,325,082 entitled "Comprehensive Vehicle Information Storage System"; U.S. Pat. No. 5,199,325 entitled "Electronic Shift or Clutch Actuator for a Vehicle Transmission" to Dana Corporation; and U.S. Pat. No. 5,303,807 entitled "Electrohydraulic Device for Controlling the Engagement of the Clutch in Motor Vehicles and the Like" to Fadiel.

Some examples of thermal conductors which may be utilized in accordance with the present invention may be found in the following U.S. patents: U.S. Pat. No. 5,199,165 entitled "Heat Pipe-electrical Interconnect Integration Method for Chip Modules" to Hewlett-Packard; U.S. Pat. No. 5,243,218 entitled "Cooling Structure for Electronics Devices" to Fujitsu; U.S. Pat. No. 5,296,310 entitled "High Conductivity Hybrid Material for Thermal Management" to Materials Science Corporation; and U.S. Pat. No. 5,345,107 entitled "Cooling Apparatus for Electronic Device" to Hitachi.

Some examples of seals for electronics components which may be utilized in accordance with the present invention may be found in the following U.S. patents: U.S. Pat. No. 5,278,357 entitled "Electric Wire Holding Case Preventing Oil Leak" to Yazaki; U.S. Pat. No. 5,326,589 entitled "Method of Protecting Electronic or Electric Part" to Shin-Etsu; U.S. Pat. No. 5,243,131 entitled "Housing for an Electronic Circuit" to Bosch; and U.S. Pat. No. 5,282,114 entitled "Ruggedized Computer Assembly Providing Accessibility and Adaptability to, and Effective Cooling of, Electronic Components" to Codar.

Some examples of devices for testing electronic components which may be utilized in accordance with the present invention may be found in the following U.S. patents: U.S. Pat. No. 5,289,117 entitled "Testing of Integrated Circuit Devices on Loaded Printed Circuit" to Everett Charles; U.S. Pat. No. 5,307,290 entitled "System for the Automatic Testing, Preferably on a Bench, of Electronic Control Systems Which are Intended to be Fitted in Vehicles" to Fiat; and U.S. Pat. No. 5,315,252 entitled "Automotive Test System with Input Protection" to SPX Corporation.

Some examples of optical and other systems which may be utilized with or in the present invention may be found in the following U.S. patents:

U.S. Pat. No. : 5,280,981, Inventor: Gordon R. Schulz, Title: End effector with load-sensitive digit actuation mechanisms; U.S. Pat. No. : 5,250,888, Inventor: Hang du Yu, Title: Apparatus for and process of rotating a display; U.S. Pat. No. : 5,191,284, Inventors: Roberto Moretti and Angelo Varvello, Title: Device for detecting the relative rotational speed of two elements in a vehicle wheel; U.S. Pat. No. : 5,239,263, Inventors: Hitoshi Iwata, Katsuhiro Minami, Hisahiro Ando, Hisashi Hirose and Shigeru Iguchi, Title: Magnetic rotation sensor for rotary shaft; U.S. Pat. No. : 5,252,919, Inventor: Saburo Uemura, Title: Apparatus producing trapezoidal waveforms from a pair of magnetic sensors for detecting the rotating angle of an object; U.S. Pat. No. : 5,291,319, Inventor: Ellis D. Harris, Title: Rotating disc optical synchronization system using binary diffractive optical elements; U.S. Pat. No. : 5,307,549, Inventors: Seisuke Tsutsumi and Nobuyuki Ito, Title: Apparatus and method for synchronized control of machine tools; U.S. Pat. No. : 5,309,094, Inventors: Christian Rigaux and Pascal Lhote, Title: Bearing rotary speed sensor with concentric multipole magnetic rings axially aligned with collector branches; U.S. Pat. No. : 5,192,877, Inventors: Jean Bittebierre and Philippe Biton, Title: Hall Effect Sensor and component providing differential detection; Inventors: Shigemi Murata and Masayuki Ikeuchi, Title: Angle detecting device having improved mounting arrangement for mounting Hall-effect sensor.

Some examples of control devices and other systems which might be used with or in the present invention are: U.S. Pat. No. : 4,852,419, Inventors: Friedrich Kittel, Dieter Lutz, Franz Nagler, Horst Oppitz and Gerhard Gasper, Title: Control device, in particular for a motor-vehicle friction clutch; U.S. Pat. No. : 5,212,380, Inventors: Seiichi Sato, Kazuo Yamaguchi, Yoshi Kurosawa, Atsushi Ueda and Masami Matsumura, Title: Automotive engine control system with rotary encoder indexing; U.S. Pat. No. : 5,326,160, Inventors: John P. Bayliss and Sean Byrnes, Title: Hydraulic systems for vehicles; U.S. Pat. No. : 5,307,013, Inventors: Alfred J. Santos and Michael C. Brauer, Title: Digital position sensor system for detecting automatic transmission gear modes.

Some examples of hydraulic master cylinders which may be utilized in accordance with the present invention may be found in the following U.S. patents: U.S. Pat. No. 5,211,099 entitled "Slave Cylinder for a Hydraulic Actuating System of a Motor Vehicle Friction Clutch" to Fichtel & Sachs; No. 5,213,187 entitled "Device Relating to a Semi-automatic Clutch for Vehicles"; No. 5,284,017 entitled "Hydraulic Master Cylinder" to Automotive Products; and No. 5,301,597 entitled "Hydraulic Cylinder" to Kugelfischer Schafer.

Some examples of clutch assemblies and various components associated therewith which could possibly utilize the present invention may be disclosed in the following U.S. patents: U.S. Pat. No. 4,684,007 to Maucher, entitled "Clutch Plate"; U.S. Pat. No. 4,635,780 to Wiggert, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Some additional examples of hydraulic and/or pneumatic devices which can possibly utilize the piston-cylinder arrangement of the present invention are disclosed by the following U.S. patents: U.S. Pat. No. 5,092,125 to Leight et al., entitled "Seal"; U.S. Pat. No. 4,635,778 to Lederman, entitled "Fluid-Operated Piston"; U.S. Pat. No. 4,960,188 to Wossner, entitled "Single-Tube Vibration Damper of Variable Damping Force"; U.S. Pat. No. 5,064,030 to Wossner, entitled "Impact Damping Unit"; U.S. Pat. No. 4,599,860 to Parsons, entitled "Liquid Pressure Apparatus"; and U.S. Pat. No. 2,317,601 to Fowler on Mar. 7, 1940, entitled "Pressure Braking System".

Hydraulic braking systems which could also possibly utilize the present invention may be disclosed in the following U.S. patents: U.S. Pat. No. 4,634,190 to Wupper, entitled "Hydraulic Brake System With Slip Control"; U.S. Pat. No. 4,643,488 to Reinartz, entitled "Hydraulic Vehicle Servo Brake"; U.S. Pat. No. 4,643,489 to Reinartz et al., entitled "Hydraulic Brake System With Slip Control"; U.S. Pat. No. 4,656,833 to Belart, entitled "Hydraulic Brake System for Automotive Vehicles"; and U.S. Pat. No. 4,902,077 to Belart et al., entitled "Hydraulic Brake System".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. P 44 33 826.0, filed on Sep. 22, 1994, having inventors Udo Borschert, Lutz Leimbach, Ullrich Scherpf, Peter Schmidt, Manfred Waning, and Michael Zottmann, and DE-OS P 44 33 826.0 and DE-PS P 44 33 826.0, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically operated clutch assembly for a motor vehicle, said clutch assembly comprising:

a flywheel having an axis of rotation and defining an axial direction parallel to the axis of rotation;

a clutch disc;

a pressure plate for applying an axially directed force to said clutch disc, with respect to said axis of rotation of said flywheel, to engage said clutch disc with said flywheel;

said clutch disc being disposed between said flywheel and said pressure plate;

said clutch disc comprising friction lining means for contacting said pressure plate and said flywheel during engagement of said clutch disc with said flywheel;

means for hydraulically actuating said clutch disc;

said hydraulic actuating means comprising:
chamber means, said chamber means having a first end and a second end, at least a portion of said chamber means containing hydraulic fluid therein;
means for being acted upon by said hydraulic fluid;
said means for being acted upon by said hydraulic fluid being disposed in said chamber means;
means for operatively connecting said pressure plate to said means for being acted upon by said hydraulic fluid;
means for providing hydraulic fluid into and out of said chamber means to actuate said pressure plate;

means for activating said hydraulic actuating means;

said activating means comprising:
a housing;
a mechanical drive mechanism for converting a first geometric movement into a second geometric movement;
means for driving said drive mechanism;
said driving means being connected to said drive mechanism;
electronic means;
said electronic means being operatively connected to said drive mechanism for providing signals to said drive mechanism;
cylinder means for providing hydraulic fluid under pressure to said means for providing hydraulic fluid into and out of said chamber means;
said mechanical drive mechanism being connected to said cylinder means to drive hydraulic fluid into and out of said chamber means;
said housing of said activating means comprising a first unitary part and a second unitary part;
said first unitary part and said second unitary part of said housing being disposed substantially adjacent one another;
said first unitary part comprising means for being connected to said second unitary part;
said second unitary part comprising means for being connected to said first unitary part;
said first unitary part and said second unitary part being connected together by said means for being connected to said second unitary part and said means for being connected to said first unitary part, to form a three-dimensional, internal cavity within said housing;
at least a substantial portion of said mechanical drive mechanism being disposed within said first unitary part;
at least a substantial portion of said electronic means being disposed within said second unitary part; and
said electronic means and said mechanical drive mechanism being disposed substantially adjacent one another in said three-dimensional, internal cavity formed by said first unitary part and said second unitary part.

2. The hydraulically operated clutch assembly according to claim 1, wherein:

said first unitary part comprises a first three-dimensional cavity;

said second unitary part comprises a second three-dimensional cavity; and said first three-dimensional cavity of said first unitary part and said second three-dimensional cavity of said second unitary part together comprise said three-dimensional, internal cavity.

3. The hydraulically operated clutch assembly according to claim 2, wherein:
said electronic means is connected within said first unitary part; and
said mechanical drive mechanism is connected within said second unitary part.

4. The hydraulically operated clutch assembly according to claim 3, wherein:
said first unitary part comprises first unitary part means;
said first unitary part means comprises a first portion and a second portion;
said second unitary part comprises second unitary part means;
said second unitary part means comprises a first portion and a second portion;
each of said first portions of said first unitary part means and said second unitary part means has a height dimension;
each of said second portions of said first unitary part means and said second unitary part means has a height dimension;
said height dimension of said first portion of said first unitary part means is substantially greater than said height dimension of said second portion of said first unitary part means;
said height dimension of said first portion of said second unitary part means is substantially greater than said height dimension of said second portion of said second unitary part means;
said first portion of at least one of: said first unitary part means and said second unitary part means extends toward and into said second portion of the other of: said first unitary part means and said second unitary part means; and
said second portion of at least one of: said first unitary part means and said second unitary part means is confined within said second portion of said at least one of: said first unitary part means and said second unitary part means.

5. The hydraulically operated clutch assembly according to claim 4, wherein:
said first unitary part further comprises at least a first housing wall and a second housing wall;
said first housing wall and said second housing wall are disposed opposite one another;
each of said first housing wall and said second housing wall of said first unitary part has a height dimension;
said height dimension of said first housing wall is substantially greater than said height dimension of said second housing wall;
each of said first housing wall and said second housing wall has an inner end;
said second unitary part further comprises at least a third housing wall and a fourth housing wall;
said third housing wall and said fourth housing wall are disposed opposite one another;
each of said third housing wall and said fourth housing wall of said second unitary part has a height dimension;
said height dimension of said third housing wall is substantially greater than said height dimension of said fourth housing wall;

each of said third housing wall and said fourth housing wall has an inner end;
said inner end of said first housing wall of said first unitary part is disposed adjacent, and in contact with, said inner end of said fourth housing wall of said second unitary part; and
said inner end of said second housing wall of said first unitary part is disposed adjacent, and in contact with, said inner end of said third housing wall of said second unitary part.

6. The hydraulically operated clutch assembly according to claim 5, wherein:
at least one of: said first housing wall of said first unitary part and said third housing wall of said second unitary part further comprises an aperture;
said aperture for permitting an extended portion of said electronic means to project beyond said three-dimensional, internal cavity; and
said aperture comprises means for sealing said extended portion of said electronic means.

7. The hydraulically operated clutch assembly according to claim 6, wherein:
said electronic means of said first unitary part comprises a plurality of electronic elements;
each of said plurality of electronic elements has at least two height dimensions;
said at least two height dimensions of said plurality of electronic elements include at least a first height and a second height of said electronic elements;
said first height of said electronic elements is substantially greater than said second height of said electronic elements;
said first height of said electronic elements is disposed substantially adjacent said first housing wall of said first unitary part;
said second height of said electronic elements is disposed substantially adjacent said second housing wall of said first unitary part;
said mechanical drive mechanism of said second unitary part comprises a plurality of mechanical elements;
each of said plurality of mechanical elements has at least two height dimensions;
said at least two height dimensions of said plurality of mechanical elements include at least a first height and a second height of said mechanical elements;
said first height of said mechanical elements is substantially greater than said second height of said mechanical elements;
said first height of said mechanical elements is disposed substantially adjacent said third housing wall of said second unitary part;
said second height of said mechanical elements is disposed substantially adjacent said fourth housing wall of said second unitary part;
said first unitary part and said second unitary part together further comprise at least one lateral housing wall;
said at least one lateral housing wall comprises at least a first portion and a second portion;
said first unitary part comprises said first portion of said at least one lateral housing wall;
said second unitary part comprises said second portion of said at least one lateral housing wall;
each of said first portion and said second portion of said at least one lateral housing wall has a first end and a second end;

said first end of said first portion of said at least one lateral housing wall is disposed substantially adjacent, and in contact with, said second housing wall of said first unitary part;

said second end of said first portion of said at least one lateral housing wall is disposed substantially adjacent, and in contact with, said first housing wall of said first unitary part;

said first portion of said at least one lateral housing wall is disposed perpendicular to said first housing wall and said second housing wall of said first unitary part;

said first portion of said at least one lateral housing wall has an inner end;

said inner end of said first portion of said at least one lateral housing wall extends substantially between said inner end of said first housing wall of said first unitary part and said inner end of said second housing wall of said first unitary part;

said inner end of said first portion of said at least one lateral housing wall comprises an angled portion extending substantially between, and connecting, said greater height dimension of said first housing wall with respect to said height dimension of said second housing wall;

said first end of said second portion of said at least one lateral housing wall is disposed substantially adjacent, and in contact with, said third housing wall of said second unitary part;

said second end of said second portion of said at least one lateral housing wall is disposed substantially adjacent, and in contact with, said fourth housing wall of said second unitary part;

said second portion of said at least one lateral housing wall is disposed perpendicular to both of said third housing wall and said fourth housing wall of said second unitary part;

said second portion of said at least one lateral housing wall has an inner end;

said inner end of said second portion of said at least one lateral housing wall extends substantially between said inner end of said third housing wall of said second unitary part and said inner end of said fourth housing wall of said second unitary part;

said inner end of said second portion of said at least one lateral housing wall comprises an angled portion extending substantially between, and connecting, said greater height dimension of said third housing wall with respect to said height dimension of said fourth housing wall;

each of said angled portions of said first portion and said second portion of said at least one lateral housing wall has a contour;

said contour of said angled portion of said first portion of said at least one lateral housing wall and said contour of said angled portion of said second portion of said at least one lateral housing wall match one another;

said matching contours of said angled portions of said first portion and said second portion of said at least one lateral housing wall are disposed substantially adjacent one another;

said means for being connected to said first unitary part further comprises said contour of said angled portion of said second portion being matched with said contour of said angled portion of said first portion of said at least one lateral housing wall; and said means for being connected to said second unitary part further comprises said contour of said angled portion of said first portion being matched with said contours of said angled portion of said second portion of said at least one lateral housing wall.

8. The hydraulically operated clutch assembly according to claim 7, wherein:

said plurality of electronic elements further comprises at least one power transistor;

said at least one power transistor being disposed on at least one of: said first housing wall of said first unitary part, said second housing wall of said first unitary part, and said first portion of said at least one lateral housing wall;

said first unitary part and said second unitary part together comprise a first means for connecting said at least one power transistor to said at least one of: said first housing wall of said first unitary part, said second housing wall of said first unitary part, and said first portion of said at least one lateral housing wall; and said first connecting means comprising means for providing an electrically insulating conductor for said at least one power transistor;

said electronic elements further comprise means for electronically controlling said mechanical elements;

said electronic elements further comprise means for providing electronic power to said mechanical elements;

said electronic means for providing signals to said drive mechanism comprise said means for electronically controlling said mechanical elements; and said electronic means for providing signals to said drive mechanism further comprise said means for providing electronic power to said mechanical elements.

9. The hydraulically operated clutch assembly according to claim 8, wherein:

said mechanical elements and said second unitary part together comprise a mechanical module;

said electronic elements and said first unitary part together comprise an electronic module;

said mechanical module is configured for being tested separately from said electronic module for verifying the correct operation of said mechanical module;

said electronic module is configured for being tested separately from said mechanical module for verifying the correct operation of said electronic module;

said activating means comprises a second means for connecting said mechanical module separately from said electronic module;

said activating means comprises a third means for connecting said electronic module separately from said mechanical module;

said mechanical module is connected with said activating means separately from said electronic module by said means for connecting said mechanical module separately from said electronic module; and said electronic module is connected with said activating means separately from said mechanical module by said means for connecting said electronic module separately from said mechanical module.

10. The hydraulically operated clutch assembly according to claim 9, wherein:

said electronic module and said mechanical module are disposed adjacent one another;

said three-dimensional, internal cavity further comprises a partition;

said partition is disposed substantially between said electronic module and said mechanical module;

said partition comprises a plasticized material;

said plasticized material of said partition is disposed between said first height and said second height of said electronic elements of said electronic module, and said first height and said second height of said mechanical elements of said mechanical module;

said first height and said second height of said electronic elements of said electronic module form a contour;

said plasticized material of said partition is adapted to said contour of said first height and said second height of said electronic elements of said electronic module;

said first height and said second height of said mechanical elements of said mechanical module form a contour;

said plasticized material of said partition is additionally adapted to said contour of said first height and said second height of said mechanical elements of said mechanical module; and said partition provides a division of said electronic module and said mechanical module with respect to one another.

11. The hydraulically operated clutch assembly according to claim 9, wherein:

said electronic module and said mechanical module together comprise a unitary part of said three-dimensional, internal cavity; and at least portions of one of: said electronic module and said mechanical module extend toward and are in contact with at least portions of the other of: said electronic module and said mechanical module.

12. In a hydraulically operated clutch assembly, for a motor vehicle, which clutch assembly comprises a flywheel defining an axis of rotation and an axial direction parallel to the axis of rotation, which clutch assembly further comprises a clutch disc and a pressure plate for applying an axially directed force to the clutch disc with respect to the axis of rotation of the flywheel to engage the clutch disc with the flywheel, which clutch disc is disposed between the flywheel and the pressure plate, which clutch disc comprises friction lining means for contacting the pressure plate and the flywheel during engagement of the clutch disc with the flywheel, which clutch assembly further comprises means for hydraulically actuating the clutch disc, which hydraulic actuating means comprises chamber means having a first end and a second end, with at least a portion of the chamber means containing hydraulic fluid therein, which clutch assembly further comprises means for being acted upon by hydraulic fluid, which means for being acted upon by hydraulic fluid is disposed in the chamber means, which clutch assembly further comprises means for operatively connecting the pressure plate to the means for being acted upon by hydraulic fluid, which clutch assembly further comprises means for providing hydraulic fluid into and out of the chamber means to actuate the pressure plate, means for activating said hydraulic actuating means;

said activating means comprising:

a housing;

a mechanical drive mechanism for converting a first geometric movement into a second geometric movement;

means for driving said drive mechanism;

said driving means being connected to said drive mechanism;

said activating means further comprising electronic means;

said electronic means being operatively connected to said drive mechanism to provide signals to said drive mechanism;

cylinder means for providing hydraulic fluid under pressure to said means for providing hydraulic fluid into and out of said chamber means;

said mechanical drive mechanism being connected to said cylinder means to drive hydraulic fluid into and out of said chamber means;

said housing of said activating means comprising a first unitary part and a second unitary part;

at least portions of said first unitary part and at least portions of said second unitary part of said housing being disposed substantially adjacent one another;

said first unitary part comprising means for being connected to said second unitary part;

said second unitary part comprising means for being connected to said first unitary part;

said first unitary part and said second unitary part being connected together, by said means for being connected to said second unitary part and said means for being connected to said first unitary part, to form a three-dimensional, internal cavity within said housing;

at least a substantial portion of said mechanical drive mechanism being disposed within said first unitary part;

at least a substantial portion of said electronic means being disposed within said second unitary part; and said electronic means and said mechanical drive mechanism being disposed substantially adjacent one another in said three-dimensional, internal cavity formed by said first unitary part and said second unitary part.

13. In the hydraulically operated clutch assembly according to claim 12, wherein:

said first unitary part comprises a first three-dimensional cavity;

said second unitary part comprises a second three-dimensional cavity;

said first three-dimensional cavity of said first unitary part and said second three-dimensional cavity of said second unitary part together comprise said three-dimensional, internal cavity;

said electronic means is connected within said first unitary part; and said mechanical drive mechanism is connected within said second unitary part.

14. In the hydraulically operated clutch assembly according to claim 13, wherein:

said first unitary part comprises first unitary part means;

said first unitary part means comprises a first portion and a second portion;

said second unitary part comprises second unitary part means;

said second unitary part means comprises a first portion and a second portion;

each of said first portions of said first unitary part means and said second unitary part means has a height dimension;

each of said second portions of said first unitary part means and said second unitary part means has a height dimension;

said height dimension of said first portion of said first unitary part means is substantially greater than said height dimension of said second portion of said first unitary part means;

said height dimension of said first portion of said second unitary part means is substantially greater than said height dimension of said second portion of said second unitary part means;

said first portion of at least one of: said first unitary part means and said second unitary part means extends toward and into said second portion of the other of: said first unitary part means and said second unitary part means;

said second portion of at least one of: said first unitary part means and said second unitary part means is confined within said second portion of said at least one of: said first unitary part means and said second unitary part means;

said first unitary part further comprises at least a first housing wall and a second housing wall;

said first housing wall and said second housing wall are disposed opposite one another;

each of said first housing wall and said second housing wall of said first unitary part has a height dimension;

said height dimension of said first housing wall is substantially greater than said height dimension of said second housing wall;

each of said first housing wall and said second housing wall has an inner end;

said second unitary part further comprises at least a third housing wall and a fourth housing wall;

said third housing wall and said fourth housing wall are disposed opposite one another;

each of said third housing wall and said fourth housing wall of said second unitary part has a height dimension;

said height dimension of said third housing wall is substantially greater than said height dimension of said fourth housing wall;

each of said third housing wall and said fourth housing wall has an inner end;

said inner end of said first housing wall of said first unitary part is disposed adjacent, and in contact with, said inner end of said fourth housing wall of said second unitary part; and said inner end of said second housing wall of said first unitary part is disposed adjacent, and in contact with, said inner end of said third housing wall of said second unitary part.

15. In the hydraulically operated clutch assembly according to claim 14, wherein:

at least one of: said first housing wall of said first unitary part and said third housing wall of said second unitary part further comprises an aperture;

said aperture for permitting an extended portion of said electronic means to project beyond said three-dimensional, internal cavity;

said aperture comprises means for sealing said extended portion of said electronic means;

said electronic means of said first unitary part comprises a plurality of electronic elements;

each of said plurality of electronic elements has at least two height dimensions;

said at least two height dimensions of said plurality of electronic elements include at least a first height and a second height of said electronic elements;

said first height of said electronic elements is substantially greater than said second height of said electronic elements;

said first height of said electronic elements is disposed substantially adjacent said first housing wall of said first unitary part;

said second height of said electronic elements is disposed substantially adjacent said second housing wall of said first unitary part;

said mechanical drive mechanism of said second unitary part comprises a plurality of mechanical elements;

each of said plurality of mechanical elements has at least two height dimensions;

said at least two height dimensions of said plurality of mechanical elements include at least a first height and a second height of said mechanical elements;

said first height of said mechanical elements is substantially greater than said second height of said mechanical elements;

said first height of said mechanical elements is disposed substantially adjacent said third housing wall of said second unitary part;

said second height of said mechanical elements is disposed substantially adjacent said fourth housing wall of said second unitary part;

said first unitary part and said second unitary part together further comprise at least one lateral housing wall;

said at least one lateral housing wall comprises at least a first portion and a second portion;

said first unitary part comprises said first portion of said at least one lateral housing wall;

said second unitary part comprises said second portion of said at least one lateral housing wall;

each of said first portion and said second portion of said at least one lateral housing wall has a first end and a second end;

said first end of said first portion of said at least one lateral housing wall is disposed substantially adjacent, and in contact with, said second housing wall of said first unitary part;

said second end of said first portion of said at least one lateral housing wall is disposed substantially adjacent, and in contact with, said first housing wall of said first unitary part;

said first portion of said at least one lateral housing wall is disposed perpendicular to said first housing wall and said second housing wall of said first unitary part;

said first portion of said at least one lateral housing wall has an inner end;

said inner end of said first portion of said at least one lateral housing wall extends substantially between said inner end of said first housing wall of said first unitary part and said inner end of said second housing wall of said first unitary part;

said inner end of said first portion of said at least one lateral housing wall comprises an angled portion extending substantially between, and connecting, said greater height dimension of said first housing wall with respect to said height dimension of said second housing wall;

said first end of said second portion of said at least one lateral housing wall is disposed substantially adjacent, and in contact with, said third housing wall of said second unitary part;

said second end of said second portion of said at least one lateral housing wall is disposed substantially adjacent, and in contact with, said fourth housing wall of said second unitary part;

said second portion of said at least one lateral housing wall is disposed perpendicular to both of said third housing wall and said fourth housing wall of said second unitary part;

said second portion of said at least one lateral housing wall has an inner end;

said inner end of said second portion of said at least one lateral housing wall extends substantially between said inner end of said third housing wall of said second unitary part and said inner end of said fourth housing wall of said second unitary part;

said inner end of said second portion of said at least one lateral housing wall comprises an angled portion extending substantially between, and connecting, said greater height dimension of said third housing wall with respect to said height dimension of said fourth housing wall;

each of said angled portions of said first portion and said second portion of said at least one lateral housing wall has a contour;

said contour of said angled portion of said first portion of said at least one lateral housing wall and said contour of said angled portion of said second portion of said at least one lateral housing wall match one another;

said matching contours of said angled portions of said first portion and said second portion of said at least one lateral housing wall are disposed substantially adjacent one another;

said means for being connected to said first unitary part further comprises said contour of said angled portion of said second portion being matched with said contour of said angled portion of said first portion of said at least one lateral housing wall; and said means for being connected to said second unitary part further comprises said contour of said angled portion of said first portion being matched with said contours of said angled portion of said second portion of said at least one lateral housing wall.

16. The hydraulically operated clutch assembly according to claim 15, wherein:

said plurality of electronic elements further comprises at least one power transistor;

said at least one power transistor being disposed on at least one of: said first housing wall of said first unitary part, said second housing wall of said first unitary part, and said first portion of said at least one lateral housing wall;

said first unitary part and said second unitary part together comprise a first means for connecting said at least one power transistor to said at least one of: said first housing wall of said first unitary part, said second housing wall of said first unitary part, and said first portion of said at least one lateral housing wall;

said first connecting means comprising means for providing an electrically insulating conductor for said at least one power transistor;

said electronic elements further comprise means for electronically controlling said mechanical elements;

said electronic elements further comprise means for providing electronic power to said mechanical elements;

said electronic means for providing signals to said drive mechanism comprise said means for electronically controlling said mechanical elements;

said electronic means for providing signals to said drive mechanism further comprise said means for providing electronic power to said mechanical elements;

said mechanical elements and said second unitary part together comprise a mechanical module;

said electronic elements and said first unitary part together comprise an electronic module;

said mechanical module is configured for being tested separately from said electronic module for verifying the correct operation of said mechanical module;

said electronic module is configured for being tested separately from said mechanical module for verifying the correct operation of said electronic module;

said activating means comprises a second means for connecting said mechanical module separately from said electronic module;

said activating means comprises a third means for connecting said electronic module separately from said mechanical module;

said mechanical module is connected with said activating means separately from said electronic module by said means for connecting said mechanical module separately from said electronic module;

said electronic module is connected with said activating means separately from said mechanical module by said means for connecting said electronic module separately from said mechanical module;

said electronic module and said mechanical module are disposed adjacent one another;

said three-dimensional, internal cavity further comprises a partition;

said partition is disposed substantially between said electronic module and said mechanical module;

said partition comprises a plasticized material;

said plasticized material of said partition is disposed between said first height and said second height of said electronic elements of said electronic module, and said first height and said second height of said mechanical elements of said mechanical module;

said first height and said second height of said electronic elements of said electronic module form a contour;

said plasticized material of said partition is adapted to said contour of said first height and said second height of said electronic elements of said electronic module;

said first height and said second height of said mechanical elements of said mechanical module form a contour;

said plasticized material of said partition is additionally adapted to said contour of said first height and said second height of said mechanical elements of said mechanical module; and said partition provides a division of said electronic module and said mechanical module with respect to one another.

17. In the hydraulically operated clutch assembly according to claim 15, wherein:

said electronic module and said mechanical module together comprise a unitary part of said three-dimensional, internal cavity; and at least portions of one of: said electronic module and said mechanical module extend toward and are in contact with at least portions of the other of: said electronic module and said mechanical module.

18. In a clutch assembly, for a motor vehicle, an actuator to actuate said clutch assembly;

said actuator comprising:
- a housing;
- a mechanical drive mechanism for converting a first geometric movement into a second geometric movement;
- a driver to drive said mechanical drive mechanism;
- said driver being connected to said mechanical drive mechanism;
- said actuator further comprising an electronic subassembly;
- said electronic subassembly being operatively connected to activate to said mechanical drive mechanism;
- said housing of said actuator comprising a first part and a second part;
- said first part and said second part being connected together to form a three-dimensional, internal cavity having an internal contour within said housing;
- said electronic subassembly and said mechanical drive mechanism being disposed in said three-dimensional, internal cavity formed by said first part and said second part,
- said mechanical drive mechanism being configured for being tested separately from said electronic subassembly for verifying the operability of said mechanical drive mechanism;
- said electronic subassembly being configured for being tested separately from said mechanical drive mechanism for verifying the operability of said electronic subassembly;
- at least part of said electronic subassembly and at least part of said mechanical drive mechanism being configured and disposed to conform to said internal contour of said internal cavity; and
- said electronic subassembly and said mechanical drive mechanism being configured and disposed to minimize at least one dimension of said housing.

19. In the clutch assembly according to claim 18 wherein:

said housing comprises at least one housing wall;

at least a portion of said electronic subassembly being fastenable to said at least one housing wall to cool said electronic subassembly.

20. In the clutch assembly according to claim 19, wherein:

said three-dimensional, internal cavity further comprises a partition; and said partition being disposed between said electronic subassembly and said mechanical drive mechanism.

* * * * *

UNITED STATES PATENT AND TRADEMARK OFFICE
CERTIFICATE OF CORRECTION

PATENT NO. : 5,695,037

DATED : December 9, 1997

INVENTOR(S) : Udo BORSCHERT, Lutz LEIMBACH, Ullrich SCHERPF, Peter SCHMIDT, Manfred WANING and Michael ZOTTMANN It is certified that error appears in the above-identified patent and that said Letters Patent is hereby corrected as shown below:

In column 14, line 51, after 'to', delete "Wiggert," and insert --Wiggen,--.

Signed and Sealed this

Nineteenth Day of May, 1998

Attest:

BRUCE LEHMAN

Attesting Officer

Commissioner of Patents and Trademarks